United States Patent [19]
Metroka et al.

[11] Patent Number: 5,754,645
[45] Date of Patent: May 19, 1998

[54] ELECTRONIC APPARATUS HAVING KEYLESS CONTROL

[75] Inventors: Michael P. Metroka, Algonquin; Kenneth W. Bolvin, Hanover Park, both of Ill.

[73] Assignee: Motorola, Inc., Schaumburg, Ill.

[21] Appl. No.: 315,999

[22] Filed: Sep. 30, 1994

Related U.S. Application Data

[62] Division of Ser. No. 280,415, Jul. 26, 1994, which is a division of Ser. No. 131,925, Oct. 4, 1993, abandoned, which is a division of Ser. No. 822,767, Jan. 21, 1992, abandoned.

[51] Int. Cl.$^6$ ............................................. H04M 9/00
[52] U.S. Cl. ................... 379/433; 379/58; 379/362; 379/358; 379/434; 345/156; 455/90
[58] Field of Search .................. 379/58, 56, 110, 379/433, 434, 358, 359, 362; 341/21, 35; 401/195; 368/10, 243, 13; 345/156, 158; 455/89, 90

[56] References Cited

U.S. PATENT DOCUMENTS

| | | | |
|---|---|---|---|
| 4,007,364 | 2/1977 | Ojima et al. | 235/152 |
| 4,726,687 | 2/1988 | Gander | 368/10 |
| 4,847,818 | 7/1989 | Olsen | 379/428 |
| 4,868,862 | 9/1989 | Ryoichi et al. | 379/438 |
| 4,959,850 | 9/1990 | Murui | 379/58 |
| 4,969,180 | 11/1990 | Watterson et al. | 401/195 |
| 5,140,632 | 8/1992 | Auten | 379/58 |
| 5,301,222 | 4/1994 | Fujiwara | 379/58 |

*Primary Examiner*—Fan Tsang
*Attorney, Agent, or Firm*—John J. King

[57] ABSTRACT

The method and apparatus of the present invention permits data entry in an electronic apparatus without using a keypad. By rotating a moveable element (104), a function, letter, or number is selected. The moveable element (104) is then moved in another direction to enter the selected item. The function, letter, or number can be displayed on a display (106), announced with a synthesized voice, or displayed and announced.

26 Claims, 3 Drawing Sheets

ELECTRONIC APPARATUS HAVING KEYLESS CONTROL

This is a division of application Ser. No. 08/280,415, filed on Jul. 26, 1994, which is a division of application Ser. No. 08/131,925, filed on Oct. 4, 1993, now abandoned, which is a division of application Ser. No. 07/822,767, filed on Jan. 21, 1992, now abandoned.

FIELD OF THE INVENTION

The present invention relates generally to data entry for a keyless electronic device.

BACKGROUND OF THE INVENTION

A wireless communications apparatus, of which a portable cellular radiotelephone subscriber unit is a convenient example, provides an appropriate setting for describing the need for the present invention. There is essentially one known technique for controlling a radiotelephone. The technique uses from two to twelve function keys in addition to the standard twelve key data pad and it includes a display for the data input.

The function keys generally include some or all of the following functions: send, end, power, recall, store, clear, function, name, volume, and menu. The number and type of keys depends on the manufacturer and the features on the phone.

Functions which are essential to the operation of the phone include send, end, power, and clear. The send function initiates a phone call to the number entered with the data keys and located in the display and also answers an incoming phone call. The end function terminates a phone call. The power function turns the radiotelephone on and off. The clear function is used when entering data to clear either one character of data or the entire display of data.

There are usually dedicated keys that store and recall names and phone numbers to and from the radiotelephone memory, namely, the store key, the recall key, and the name key. The store key stores data into a memory location. First, the data is entered into the radiotelephone with the data keys, then the store key is pressed, followed by a memory location entered with the data keys. This data can be either symbols representing names or numbers representing telephone numbers. The recall key followed by an appropriate memory location recalls the telephone number or name contained within that memory location. The name key activates a menu of names that have phone numbers corresponding to them.

The user then scrolls through the menu of names using the "#" and the "*" keys. The "#" key scrolls through the names in one direction and the "*" key in the other.

Other keys that activate various features of the phone may vary between manufacturers. The function key may activate other features of the phone denoted by the number input with the data keys that follow activation of the function key. Finally, the menu key may access a menu of advanced features that can be scrolled through using the "#" and the "*" keys.

A typical radiotelephone that uses a keypad similar to the one described above is the DYNA T•A•C cellular radiotelephone. A description of its operation is found in Motorola user manual number 68P81066E40, "DYNA T•A•C Cellular Mobile Telephone 800 MHZ Transceiver" or the portable transceiver shown and described in Motorola user manual number 68P81054E60, "DYNA T•A•C Cellular Portable Telephone G-Series". Both documents are published by and available from Motorola C & E Parts, 1313 East Algonquin Road, Schaumburg, Ill. 60196.

These functions on radiotelephones have historically been implemented with a plurality of buttons or keys disposed on the apparatus or a keypad. With the reduction in the size of the radiotelephone and the resulting size reduction of the keypad to a size that is not easily usable, there is a resulting need for an improved technique for operating a radiotelephone without the use of a keypad.

SUMMARY OF THE INVENTION

The present invention encompasses a method for operating an electronic apparatus. The apparatus has a plurality of function, memory and a moveable element. The moveable element can rotate around and slide in a first and second direction along a longitudinal axis extending through the apparatus. The method comprises the steps of rotating the moveable element to select a first function from the plurality of function then initiating the first function by sliding the moveable element in the first direction along the longitudinal axis.

DETAILED DESCRIPTION OF THE PREFERRED EMBODIMENT

Figure 1:
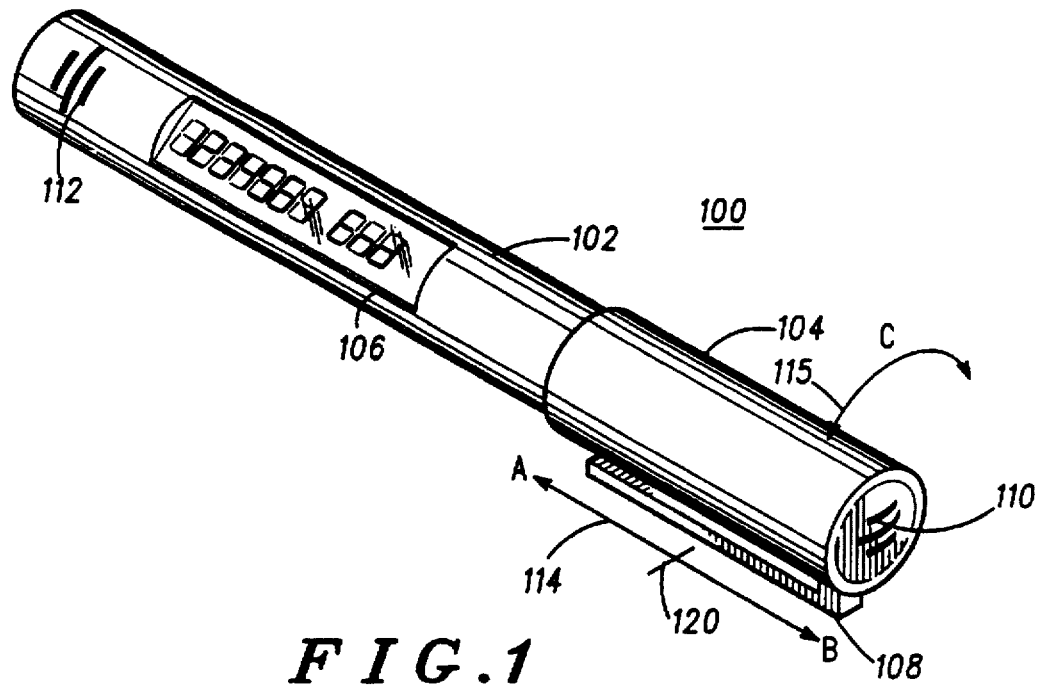
FIG. 1 shows an electronic device in accordance with the present invention.

A portable electronic device 100 is shown in FIG. 1. In the preferred embodiment, this device is a radiotelephone for use in a cellular radiotelephone system. The radiotelephone 100 includes a display 106 on the side of the unit, an earpiece 110 at one end and a microphone 112 at the opposite end of the unit, and a moveable element or end cap 104. A clip 108 is used to keep the apparatus from falling out of one's pocket, similar to the function of a clip on a conventional writing pen. This clip 108 also permits easier rotation of the end cap 104.

Referring to FIG. 1, the moveable end cap 104 rotates in direction 115 around one axis 114 and slides in and out in the A and B directions, from a neutral rest position 120, along the same axis 114. All movements of the end cap 104 are with respect to main body 102. The end cap 104 experiences a number of detents or clicks as it is rotated to give feedback to the user. As discussed later, the motion of the end cap 104 is used to enter data to be used by the radiotelephone 100 in addition to controlling power.

The display 106 provides visual feedback for these user entries. In the preferred embodiment, alphanumeric characters are entered and displayed. In alternate embodiments, other symbols may be substituted, such as Japanese katakana. These alternate symbols are described in U.S. Pat. No. 4,872,196, issued on Oct. 3, 1989 to Paul Royer et al. and assigned to Motorola Inc.

Figure 2:
FIG. 2 shows the display and indicators used in the electronic device of the present invention.

FIG. 2 illustrates the display 106 that may be used in accordance with the present invention. The display is comprised of several sections. Characters in section 202 are used to display the desired telephone number, name, or status of the device during operation. Characters in section 204 are used to display various menus for the user interface. Indicators 206, 203, and 210 display unit status such as "IU" when the radiotelephone is in use, "NS" when the radiotelephone is experiencing no service, or "RM" when the radiotelephone is roaming outside its home service area. The display 106 can be a liquid crystal display.

Figure 3:
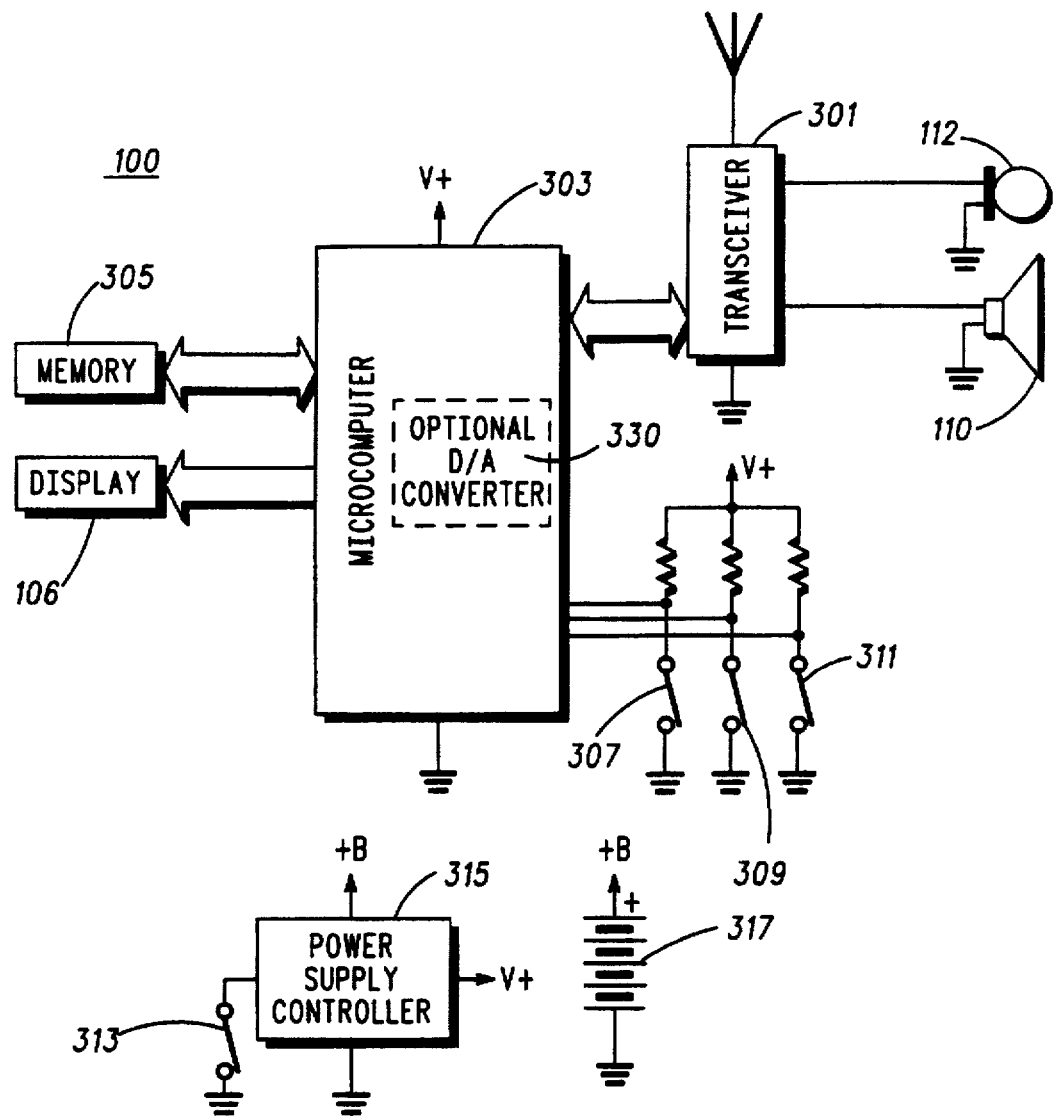
FIG. 3 shows a block diagram of the radiotelephone of the present invention.

FIG. 3 shows a schematic block diagram of the radiotelephone 100 incorporating the present invention. The transceiver 301 communicates to another transceiver such as a cellular base station. Microphone 112 and speaker 110 provide audio input and output for the transceiver. A microcomputer 303 controls transceiver 301 functions and the user interface. Memory 305 is used to store telephone numbers and alphanumeric name tags for the dialing repertory. This memory 305 can be part of the microcomputer or separate from the microcomputer.

Three switches 307, 309, and 311, connected to the microcomputer 303, sense the direction of rotation 115 of the end cap 104 and movement of cap 104 in direction 114A. A fourth switch 313 is used to turn the power supply controller 315 of apparatus 100 on and off by movement in direction 114B. The battery 317 provides the power source for the apparatus.

The power to the radiotelephone is controlled in a momentary switch fashion by the power switch 313. By pulling the end cap 104 momentarily in direction 114B a first time, the power switch 313 is momentarily closed activating the power supply controller 315 thus suppling power to the radiotelephone. When the end cap 104 is pulled momentarily in direction 114B a second time, the power switch 313 is again momentarily closed, deactivating the power supply controller 315 thus removing power from the radiotelephone. This type of switch operation is described in more detail in U.S. Pat. No. 4,798,975 to Walczak et al. and assigned to Motorola Inc. Direction 114B was chosen as the power activation direction in order to avoid inadvertently turning the radiotelephone on. If the user was placing the radiotelephone in their pocket, pushing down on the end cap 104 would have no effect on the power.

Figure 4:
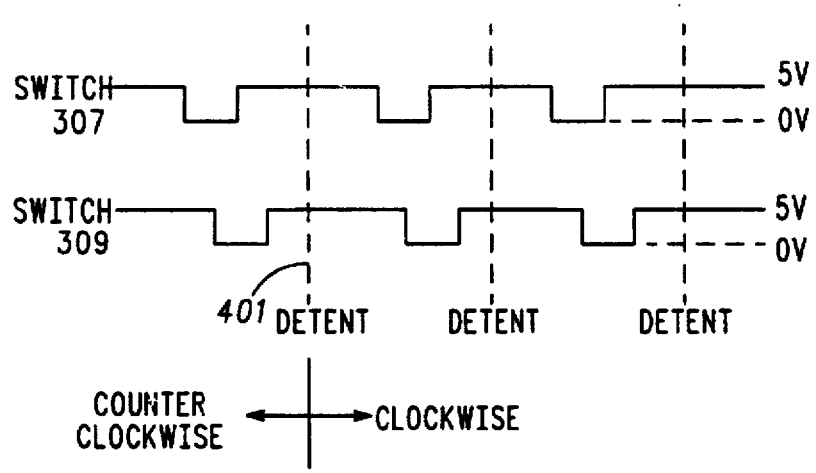
FIG. 4 shows a timing diagram of the present invention.

FIG. 4 illustrates the timing diagram associated with switches 307 and 309. A logic high, in the preferred embodiment of the present invention, is +5 V and a logic low 0 V. Alternate embodiments may use different voltages to denote logic highs and lows. Each dotted line in FIG. 4 designates the location of a detent for the movement of the end cap 104. For the purposes of this discussion, the following end cap rotations start at detent 401. Rotating the end cap element 104 in a clockwise direction results in switch 307 closing prior to switch 309. Rotating the end cap 104 in a counterclockwise direction results in switch 309 closing prior to switch 307. The microcomputer 303, sensing the levels on switches 307 and 309, determines which direction and how many closures of each switch have occurred.

The rotation of the end cap 104 causes the menu to scroll thus displaying the menu items on display section 204. When the user sees a desired menu item on display section 204, the end cap 104 is momentarily pressed in direction 114A, momentarily closing switch 311 and selecting that particular menu selection. The operation of the end cap 104 is illustrated in the examples. All menus are of the "rotary file" type in that they wrap around. An example being that when the last menu item is reached, the next menu item displayed is the first menu item.

Should one of the switches 307 or 309 fail in an open condition, the radiotelephone will still function in a fail safe manner but menus will only scroll in one direction. Slow rotation of cap 104 will result in the user seeing every item in the current menu in the display. Fast rotation of cap 104 will result in skipping of certain menu items being displayed.

Certain menu items must be skipped during fast rotation of the end cap 104 due to two factors. First, the display cannot keep up with an end cap 104 that rotates too quickly. This will cause a backlog of data to be displayed even after the end cap 104 has stopped rotating. Second, the end cap 104 rotating quickly indicates that the user wishes to progress through a large number of menu items rapidly to reach a menu item that is known to be further down the menu.

If the microcomputer 303 senses that the rotation of the end cap has exceeded the systems ability to display all the menu items, the microcomputer 303 will display only every 5th item in the preferred embodiment. Alternate embodiments can skip a greater number of items or a lesser number.

As an example of rapid entry, if the user is entering a name and is presently on the letter L of a menu containing the letters A through Z, the rapid rotating of the end cap 104 will cause the letter Q to be displayed next. This feature will speed up the users ability to operate the apparatus after becoming used to the menus while still keeping track of the location in the menu. Once the approximate location in the menu has been found, the user returns to slow turning of the end cap 104, in direction 115, to find the proper menu item.

At any point in time when entering a sequence of data, it may be necessary to clear the last input or the entire data input, depending upon how severe the mistake. This is accomplished by use of the CLR selection in the menus. By pushing the end cap 104 in direction 114A and quickly releasing, only the last entry will be cleared. By pushing the end cap 104 in direction 114A and holding for a short time, the entire entry is cleared.

Figure 6:
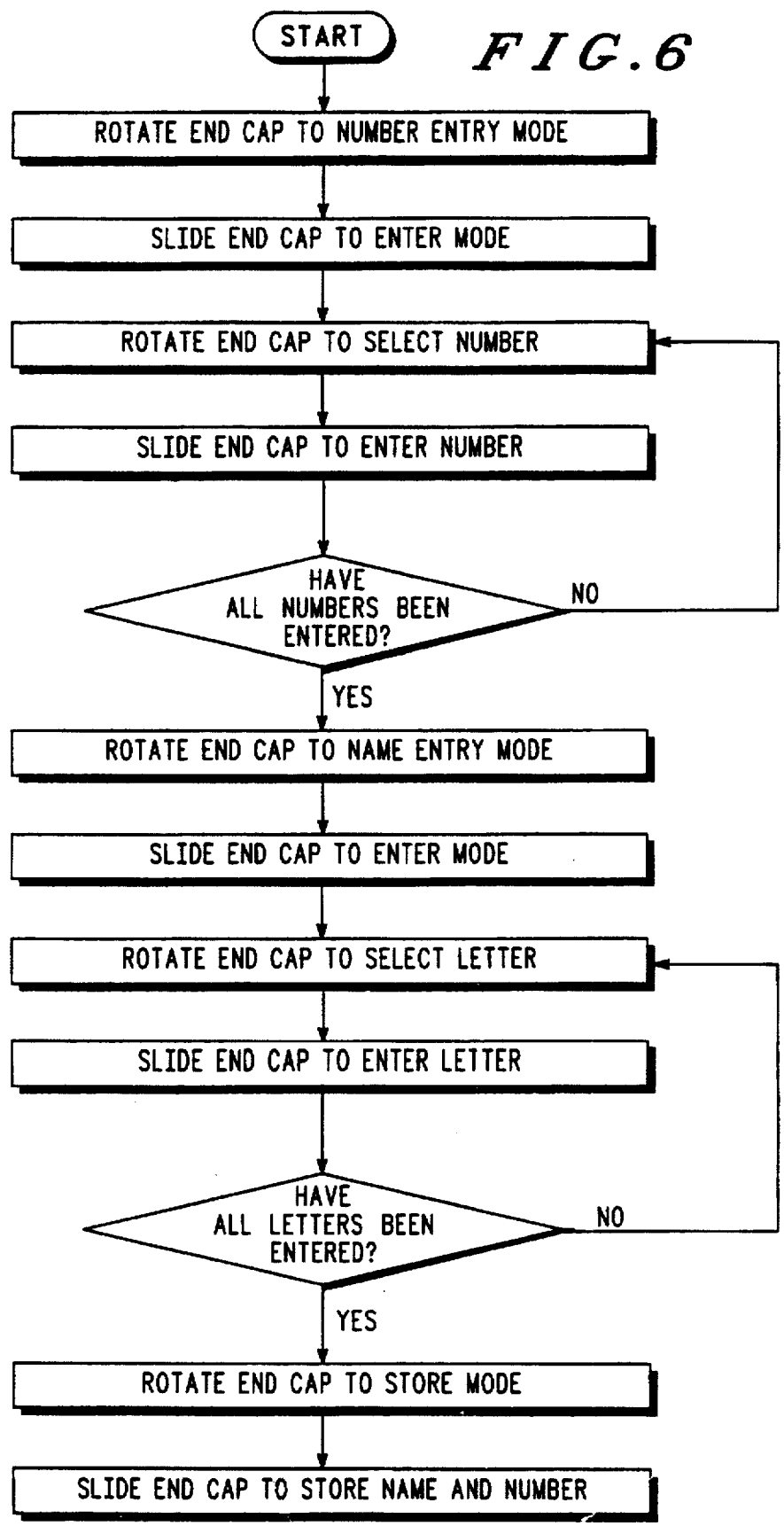
FIG. 6 shows a flow chart of a method of the present invention.

To better illustrate the operation of the end cap 104 in controlling the radiotelephone, seven examples have been provided. FIG. 6 shows a flow chart of an additional method for entering a name and associated number to be stored in the memory 305. Alternate embodiments may vary from these examples in the order of data entry or menu items.

EXAMPLE 1

(Unit is locked and User LOCK Code is "3,9,5")

Turn on unit by pulling outward on end cap 104. The "LOCKED" menu appears when the unit is turned on and the unit was previously locked to prevent unauthorized use. The user inputs the lock code as follows. Note that blank characters in the display are shown as b.

| LOCdbbb | 0bb | Initial display when unit is locked. |
|---|---|---|
| LOCdbbb | 1bb | User scrolls clockwise through 1, 2, and 3. |
| LOCdbbb | 2bb | User scrolls clockwise through 1, 2, and 3. |
| LOCdbbb | 3bb | User scrolls clockwise through 1, 2, and 3. |
| 3bbbbbb | 3bb | User pushed in on cap to select 3. |
| 3bbbbbb | 4bb | User scrolls clockwise through 4, 5, 6, 7, 8, and 9. |
| 3bbbbbb | 5bb | User scrolls clockwise through 4, 5, 6, 7, 8 and 9. |
| 3bbbbbb | 6bb | User scrolls clockwise through 4, 5, 6, 7, 8 and 9. |
| 3bbbbbb | 7bb | User scrolls clockwise through 4, 5, 6, 7, 8 and 9. |
| 3bbbbbb | 8bb | User scrolls clockwise through 4, 5, 6, 7, 8 and 9. |
| 3bbbbbb | 9bb | User scrolls clockwise through 4, 5, 6, 7, 8 and 9. |
| 39bbbbb | 9bb | User pushed in on cap to select 9. |
| 39bbbbb | 8bb | User scrolls counter clockwise |

-continued

| | | |
|---|---|---|
| 39bbbbb | 7bb | through 8, 7, 6, and 5. |
| 39bbbbb | 6bb | User scrolls counter clockwise through 8, 7, 6, and 5. |
| 39bbbbb | 5bb | User scrolls counter clockwise through 8, 7, 6, and 5. |
| ONbbbbb | RCL | User pushes in on cap to complete lock code and unlock unit. "ON" menu is now used. |

The user could have made selections by rotating the cap only in the clockwise direction. Had a mistake been entered, then the "CLR" function on the "LOCKED" menu could be used to clear the last entry.

"LOCKED" MENU: 0, 1, 2, 3, 4, 5, 6, 7, 8, 9, CLR

EXAMPLE 2

(User enters phone number 576-2600 and places a call)

The user inputs the phone number and initiates a call as follows. Note that blank characters in the display are shown as b. The "ON" menu appears when the unit is on and not in the locked mode.

| | | |
|---|---|---|
| ONbbbbb | RCL | Initial display when turned on. |
| ONbbbbb | SND | User scrolls clockwise through SND, |
| ONbbbbb | NAM | NAM, 1, 2, 3, 4, and 5. |
| ONbbbbb | 0bb | User scrolls clockwise through SND, NAM, 1, 2, 3, 4, and 5. |
| ONbbbbb | 1bb | User scrolls clockwise through SND, NAM, 1, 2, 3, 4, and 5. |
| ONbbbbb | 2bb | User scrolls clockwise through SND, NAM, 1, 2, 3, 4, and 5. |
| ONbbbbb | 3bb | User scrolls clockwise through SND, NAM, 1, 2, 3, 4, and 5. |
| ONbbbbb | 4bb | User scrolls clockwise through SND, NAM, 1, 2, 3, 4, and 5. |
| ONbbbbb | 5bb | User scrolls clockwise through SND, NAM, 1, 2, 3, 4, and 5. |
| 5bbbbbb | 5bb | User pushed in on cap to select 5.. |
| 5bbbbbb | 6bb | User scrolls clockwise through 6 & 7. |
| 5bbbbbb | 7bb | " |
| 57bbbbb | 7bb | User pushed in on cap to select 7. |
| 57bbbbb | 6bb | User scrolls counter clockwise to 6. |
| 576bbbb | 6bb | User pushed in on cap to select 6. |
| 576bbbb | 5bb | User scrolls counter clockwise through 5, 4, 3, and 2. |
| 576bbbb | 4bb | User scrolls counter clockwise through 5, 4, 3, and 2. |
| 576bbbb | 3bb | User scrolls counter clockwise through 5, 4, 3, and 2. |
| 576bbbb | 2bb | User scrolls counter clockwise through 5, 4, 3, and 2. |
| 5762bbb | 2bb | User pushed in on cap to select 2. |
| 5762bbb | 3bb | User scrolls clockwise through 3, 4, 5, and 6. |
| 5762bbb | 4bb | User scrolls clockwise through 3, 4, 5, and 6. |
| 5762bbb | 5bb | User scrolls clockwise through 3, 4, 5, and 6. |
| 5762bbb | 6bb | User scrolls clockwise through 3, 4, 5, and 6. |
| 57626bb | 6bb | User pushed in on cap to select 6. |
| 57626bb | 5bb | User scrolls counter clockwise through 5, 4, 3, 2, 1, and 0. |
| 57626bb | 4bb | User scrolls counter clockwise through 5, 4, 3, 2, 1, and 0. |
| 57626bb | 3bb | User scrolls counter clockwise through 5, 4, 3, 2, 1, and 0. |
| 57626bb | 2bb | User scrolls counter clockwise through 5, 4, 3, 2, 1, and 0. |
| 57626bb | 1bb | User scrolls counter clockwise through 5, 4, 3, 2, 1, and 0. |
| 57626bb | 0bb | User scrolls counter clockwise through 5, 4, 3, 2, 1, and 0. |
| 576260b | 0bb | User pushed in on cap to select 0. |
| 5762600 | 0bb | User pushed in on cap to select 0 again. |
| 5762600 | NAM | User scrolls counter clockwise through NAM, RCL, and SND. |
| 5762600 | SND | User scrolls counter clockwise through NAM, RCL, and SND. |
| ONbbbbb | END | User pushed in on cap to select SND to initiate a call. |
| ONbbbbb | RCL | When the user finished talking, user pushed in on cap to select END to end the call. |

"ON" MENU: RCL, SND, NAM, 0, 1, 2, 3, 4, 5, 6, 7, 8, 9, *, #, END, CLR, VOL, STO

EXAMPLE 3

(User recalls a phone number from memory location 37 and places a call. Memory location 37 contains phone number 123-4567.)

The user recalls the phone number and initiates a call as follows. Note that blank characters in the display are shown as b. The

| | | |
|---|---|---|
| ONbbbbb | RCL | Initial display when turned on in "ON" menu. |
| RCLbbbb | 0bb | User pushed in on cap to select RCL. |
| RCLbbbb | 1bb | User scrolls clockwise through 0, 1, 2, and 3. |
| RCLbbbb | 2bb | User scrolls clockwise through 0, 1, 2, and 3. |
| RCLbbbb | 3bb | User scrolls clockwise through 0, 1, 2, and 3. |
| RCLb3bb | 3bb | User pushed in on cap to select 3. |
| RCLb3bb | 4bb | User scrolls clockwise through 4, 5, 6, and 7. |
| RCLb3bb | 5bb | User scrolls clockwise through 4, 5, 6, and 7. |
| RCLb3bb | 6bb | User scrolls clockwise through 4, 5, 6, and 7. |
| RCLb3bb | 7bb | User scrolls clockwise through 4, 5, 6, and 7. |
| RCLb37b | 7bb | User pushed in on cap to select 7. |
| 1234567 | SND | Phone # from location 37 is displayed and "ON" menu is set to SND in preparation to initiate a call. |
| ONbbbbb | END | User pushed in on cap to select SND and initiate a call. "ON" menu is set to END in preparation to terminate the call when the user is finished talking. |

EXAMPLE 4

(User recalls a phone number from memory by alpha tag and places a call. Memory contains alpha tags:)

CHRIS
DALE
DAVE
DOUG B
ERIC

The user recalls the phone number and initiates a call as follows. The blank characters in the display are shown as b. The "NAME" menu appears when the "NAM" function is selected via the "ON" menu. It is used when recalling phone numbers from memory that have associated alpha name tags.

| | | |
|---|---|---|
| ONbbbbb | NAM | User scrolls through "ON" menu to NAM. |
| NAMEbbb | Abb | User pushed in on cap to select NAM function. Menu changes to NAME menu and starts at "A". |
| NAMEbbb | Bbb | User scrolls through B, C, D. |
| NAMEbbb | Cbb | " |
| NAMEbbb | Dbb | " |
| DALEbbb | bbb | User pushed in on cap to select "D". Names are displayed in alphabetical order starting with the first name beginning with the letter "D". |
| DAVEbbb | bbb | User scrolls to desired name. |
| DOUGbBb | bbb | " |
| DOUGbBb | SND | User pushes in on cap to select "DOUG B". Menu returns to "ON" menu set to SND. |
| ONbbbbb | END | User pushes in on cap to select SND and initiate the call. |

NAME MENU: A, B , C, . . . , X, Y, Z, END, CLR

EXAMPLE 5

(User enters phone number 576-2600 and stores it in memory location 25.)

The user inputs the phone number and initiates a call as follows. Note that blank characters in the display are shown as b. The "STORE" menu appear when the 'STO' function is selected via the "ON" menu. The "STORE" menu is used when storing a telephone number into memory.

| | | |
|---|---|---|
| ONbbbbb | RCL | Initial display when unit is turned on. User enters the number from example 2. |
| . | | |
| . | | |
| 5762600 | 0bb | |
| 5762600 | NAM | User scrolls through "ON" menu to STO. |
| 5762600 | SND | |
| 5762600 | RCL | |
| 5762600 | STO | |
| STObbbb | 0bb | User pushes in on cap to select STO function. |
| STObbbb | 1bb | User scrolls through STO menu to "2". |
| STObbbb | 2bb | |
| STOb2bb | 2bb | User pushes in on cap to select "2". |
| STOb2bb | 3bb | User scrolls through STO menu to "5". |
| STOb2bb | 4bb | |
| STOb2bb | 5bb | |
| STOb25b | END | User pushes in on cap to select "5". Menu returns to "ON" menu set to END. |

STORE MENU: *, 0, 1, 2, 3, 4, 5, 6, 7, 8, 9, END, CLR

EXAMPLE 6

(User increases earpiece volume by two levels out of seven from level four to level six.)

The user inputs the phone number and initiates a call as follows. Note that blank characters in the display are shown as b. The "VOLUME" menu appears when the 'VOL' function is selected via the "ON" menu. The "VOLUME SELECT" menu appears when either the 'EAR' or 'RNG' functions are selected via the "VOLUME" menu. The "VOLUME SELECT" menu has seven volume levels as well as the end function.

| | | |
|---|---|---|
| ONbbbbb | VOL | User scrolls through "ON" menu to VOL function. |
| VOLbbbb | EAR | User pushes in on cap to select VOL. Menu changes to VOL menu starting at EAR. |
| 8888bbb | EAR | User pushes in on cap to select earpiece volume. Display indicates unit is presently at level four by the four characters displayed. |
| 88888bb | EAR | User scrolls clockwise to increase level to six. |
| 888888b | EAR | |
| ONbbbbb | VOL | User pushed in on cap to select level six and menu returns to "ON" menu. |

In a similar manner, the ringer (RNG) volume level could be selected and changed. Volume increases with clockwise rotation and decreases with counter-clockwise rotation of the end cap 104. The user can select END to exit the volume menu without making a change.

VOLUME MENU: EAR, RNG, END
VOLUME SELECT MENU: 8bbbbbb, 88bbbbb, 888bbbb, 8888bbb, 88888bb, 888888b, 8888888, ENDbbbb

EXAMPLE 7

(Incoming call.)

When the phone rings indicating an incoming call, the menu returns to the "ON" menu set at SND so that the user need only push in on the cap to answer the call.

While the preferred embodiment of the present invention has been illustrated using a radiotelephone, alternate embodiments can replace the radiotelephone by other electronic devices that are too small to use a normal keypad. These include, but are not limited to pagers, radios, calculators, electronic organizers, etc.

The preferred embodiment uses the display 106 to indicate modes, alphanumeric characters, and symbols. An alternate embodiment uses voice feedback generated by the microcomputer 303 that has a built-in digital to analog converter 330 and output using the speaker 110. In this embodiment, the method of rotating the moveable element is the same as in the preferred embodiment while the modes and numbers that are selected are announced with a synthesized voice instead of the display 106. Another alternate embodiment uses both the display 106 and the synthesized voice. The voice feedback would allow visually impaired users to operate the apparatus.

Figure 5:
FIG. 5 shows an alternate embodiment of the display of the present invention.

An alternate embodiment of the present invention, illustrated in FIG. 5, can use two displays in place of the single display 106. In this embodiment, smaller three digit display is used to display the menu item while a larger display indicates the names or numbers.

By using the methods and apparatus of the present invention, an electronic device's size is not limited by the buttons or keypad. This reduces the size, weight, and the manufacturing cost thereby reducing the actual cost of the item.

I claim:

1. A method for programming a portable wireless communication device with a telephone number, the portable wireless communication device having memory, a plurality of functions, and a moveable housing element, the moveable housing element having the ability to rotate around and slide along a longitudinal axis extending through the apparatus, the method comprising the steps of:

rotating the moveable housing element to select a number entry function of the plurality of functions;

sliding the moveable housing element in a first direction along the longitudinal axis to enter the number entry function;

rotating the moveable housing element to select a first number of the telephone number;

sliding the moveable housing element in the first direction to enter the first number;

repeating the previous two steps until the telephone number has been entered;

rotating the moveable housing element to select a store function from the plurality of functions; and sliding the moveable housing element in the first direction to store a name and the telephone number.

2. The method for programming a portable wireless communication device according to claim 1 further including a step of transmitting said telephone number.

3. The method for programming a portable wireless communication device according to claim 1 wherein said steps of sliding the moveable housing element are in a first direction to enter, said method further including a step of sliding the moveable housing element in a second direction to control power to the portable wireless communication device.

4. A method for programming a portable wireless communication device with a name, the portable wireless communication device having memory, a plurality of functions, and a moveable element, the moveable element having the ability to rotate around and slide along a longitudinal axis extending through the apparatus, the method comprising the steps of:

rotating the moveable housing element to select a name entry function of the plurality of functions;

sliding the moveable housing element along the longitudinal axis to access the name entry function;

rotating the moveable housing element to select a first letter of the name;

sliding the moveable element to enter the first letter of the name;

repeating the previous two steps until a name has been entered; and transmitting a telephone number.

5. The method for programming a portable wireless communication device according to claim 4 further including a step of rotating the moveable housing element to select a store function from the plurality of functions; and sliding the moveable housing element to store the name.

6. The method for programming a portable wireless communication device according to claim 4 wherein the rotation steps comprise rotating the moveable housing element in a clockwise direction or a counterclockwise direction to select.

7. The method for programming a portable wireless communication device according to claim 4 wherein said steps of sliding the moveable housing element are in a first direction to enter, said method further including a step of sliding the moveable housing element in a second direction to control power to the portable wireless communication device.

8. A method for programming a portable wireless communication device with a telephone number and a name, the portable wireless communication device having memory, a plurality of functions, and a moveable housing element, the moveable housing element having the ability to rotate around and slide in a first and second direction along a longitudinal axis extending through the apparatus, the method comprising the steps of:

rotating the moveable housing element to select a first number of the telephone number;

sliding the moveable housing element in the first direction to enter the first number;

repeating the previous two steps until the telephone number has been entered;

rotating the moveable housing element to select a name entry function of the plurality of function;

sliding the moveable housing element in the first direction to access the name entry function;

rotating the moveable housing element to select a first letter of the name;

sliding the moveable housing element in the first direction to enter the first letter of the name;

repeating the previous two steps until the name is entered;

rotating the moveable housing element to select a store function from the plurality of functions; and sliding the moveable housing element in the first direction to store the name and the telephone number.

9. The method for programming a portable wireless communication device according to claim 8 wherein the rotation steps comprise rotating the moveable housing element in a clockwise direction or a counterclockwise direction to select.

10. The method for programming a portable wireless communication device according to claim 8 wherein said steps of rotating includes a rapid mode.

11. A method for programming an elongated wireless communication device with data, the elongated wireless communication device having a cap encapsulating the speaker, the cap having the ability to move in a first direction and a second direction, said second direction being distinct from said first direction, the method comprising the steps of:

moving the cap in the first direction to select a predetermined function of a plurality of functions;

moving the cap in the second direction to access the predetermined function;

moving the cap in the first direction to select a first data element; and moving the cap in the second direction to enter the first data element.

12. The method for programming an elongated wireless communication device with data according to claim 11 wherein said first direction comprises a rotational motion and said second direction comprises a sliding motion.

13. A method for programming an elongated wireless communication device with a telephone number, the elongated wireless communication device having memory, a plurality of functions, and a cap, the cap having the ability to rotate around and slide along a longitudinal axis extending through the elongated wireless communication device, the method comprising the steps of:

rotating the cap to select a number entry function of the plurality of functions;

sliding the cap in a first direction along the longitudinal axis to enter the number entry function;

rotating the cap to select a first number of the telephone number;

sliding the cap in the first direction to enter the first number;

repeating the previous two steps until the telephone number has been entered;

rotating the cap to select a store function from the plurality of functions; and sliding the cap in the first direction to store a name and the telephone number.

14. A portable radiotelephone device for communicating in a radiotelephone system, said radiotelephone device having a plurality of housing elements and a longitudinal axis extending lengthwise through the device, the portable radiotelephone device comprising:

a transmitter adapted to transmit radiotelephone signals;

a receiver adapted to receive radiotelephone signals;

a processor adapted to control the radiotelephone device;

a memory device, coupled to a processing means, for storing data; and a clip element movably coupled to a main housing element, said clip element being adapted to rotate around and slide along the longitudinal axis with respect to said main housing element for selecting one of the stored functions in the memory device.

15. A method for programming a portable wireless communication device with a name, the portable wireless communication device having memory, a plurality of functions, and a moveable element, the moveable element having the ability to rotate around and slide along a longitudinal axis extending through the device, the method comprising the steps of:

rotating the moveable element to select a name entry function of the plurality of functions;

sliding the moveable element along the longitudinal axis to access the name entry function;

rotating the moveable element to select a first letter of the name;

sliding the moveable element to enter the first letter of the name; and repeating the previous two steps until the name has been entered;

transmitting a telephone number.

16. The method for programming a portable wireless communication device according to claim 15 further including a step of rotating the moveable element to select a store function from the plurality of functions; and sliding the moveable element to store the name.

17. The method for programming a portable wireless communication device according to claim 15 wherein the rotation steps comprise rotating the moveable element in a clockwise direction or a counterclockwise direction to select.

18. The method for programming a portable wireless communication device according to claim 15 wherein said steps of sliding the moveable element are in a first direction to enter, said method further including a step of sliding the moveable element in a second direction to control power to the portable wireless communication device.

19. A method for programming a portable wireless communication device with data, the portable wireless communication device having a moveable clip element having the ability to move in a first direction and a second direction, said second direction being distinct from said first direction, the method comprising the steps of:

moving the moveable clip element in the first direction to select a predetermined function of a plurality of functions;

moving the moveable clip element in the second direction to access the predetermined function;

moving the moveable clip element in the first direction to select a first data element; and moving the moveable clip element in the second direction to enter the first data element.

20. The method for programming a portable wireless communication device with data according to claim 19 wherein said first direction comprises a rotational motion and said second direction comprises a sliding motion.

21. A method for programming a portable wireless communication device with a telephone number, the portable wireless communication device having memory, a plurality of functions, and a moveable clip element, the moveable clip element having the ability to rotate around and slide along a longitudinal axis extending through the apparatus, the method comprising the steps of:

rotating the moveable clip element to select a number entry function of the plurality of functions;

sliding the moveable element in a first direction along the longitudinal axis to enter the number entry function;

rotating the moveable clip element to select a first number of the telephone number;

sliding the moveable clip element in the first direction to enter the first number;

repeating the previous two steps until the telephone number has been entered;

rotating the moveable clip element to select a store function from the plurality of functions; and sliding the moveable clip element in the first direction to store a name and the telephone number.

22. The method for programming a portable wireless communication device according to claim 21 further including a step of transmitting said telephone number.

23. The method for programming a portable wireless communication device according to claim 21 wherein said steps of sliding the moveable clip element are in a first direction to enter, said method further including a step of sliding the moveable clip element in a second direction to control power to the portable wireless communication device.

24. A method for programming a portable wireless communication device with a name, the portable wireless communication device having memory, a plurality of functions, and a moveable clip element, the moveable element having the ability to rotate around and slide along a longitudinal axis extending through the device, the method comprising the steps of:

rotating the moveable clip element to select a name entry function of the plurality of functions;

sliding the moveable clip element along the longitudinal axis to access the name entry function;

rotating the moveable clip element to select a first letter of the name; and sliding the moveable clip element to enter the first letter of the name.

25. The method for programming a portable wireless communication device according to claim 24 further including a step of repeating the previous two steps until the name has been entered.

26. A method for programming a portable wireless communication device with a telephone number and a name, the portable wireless communication device having memory, a plurality of functions, and a moveable clip element, the moveable clip element having the ability to rotate around and slide in a first and second directions along a longitudinal axis extending through the apparatus, the method comprising the steps of:

rotating the moveable clip element to select a first number of the telephone number;

sliding the moveable clip element in the first direction to enter the first number;

repeating the previous two steps until the telephone number has been entered;

rotating the moveable clip element to select a name entry function of the plurality of function;

sliding the moveable clip element in the first direction to access the name entry function;

rotating the moveable clip element to select a first letter of the name;

sliding the moveable clip element in the first direction to enter the first letter of the name;

repeating the previous two steps until the name is entered;

rotating the moveable clip element to select a store function from the plurality of functions; and sliding the moveable clip element in the first direction to store the name and the telephone number.

* * * * *